(12) United States Patent
Vijayan et al.

(10) Patent No.: US 12,019,873 B2
(45) Date of Patent: Jun. 25, 2024

(54) METHODS AND SYSTEMS TO IMPROVE RESUMPTION TIME OF INPUT/OUTPUT (I/O) OPERATIONS BASED ON PREFETCHING OF CONFIGURATION DATA AND EARLY ABORT OF CONFLICTING WORKFLOWS DURING A NON-DISRUPTIVE AUTOMATIC UNPLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM

(71) Applicant: NetApp, Inc., San Jose, CA (US)

(72) Inventors: Anoop Vijayan, Karnataka (IN); Akhil Kaushik, Karnataka (IN); Sohan Shetty, Bangalore (IN); Dhruvil Shah, Karnataka (IN)

(73) Assignee: NetApp, Inc., San Jose, CA (US)

( * ) Notice: Subject to any disclaimer, the term of this patent is extended or adjusted under 35 U.S.C. 154(b) by 5 days.

(21) Appl. No.: 17/875,849

(22) Filed: Jul. 28, 2022

(65) Prior Publication Data
US 2024/0036732 A1    Feb. 1, 2024

(51) Int. Cl.
*G06F 3/06* (2006.01)
(52) U.S. Cl.
CPC .......... *G06F 3/0611* (2013.01); *G06F 3/0614* (2013.01); *G06F 3/0655* (2013.01); *G06F 3/067* (2013.01)
(58) Field of Classification Search
CPC ........ G06F 3/0611; G06F 3/065; G06F 3/067; G06F 3/0614

USPC .................................................. 711/154, 161
See application file for complete search history.

(56) References Cited

U.S. PATENT DOCUMENTS

| | | | |
|---|---|---|---|
| 8,498,967 | B1 | 7/2013 | Chatterjee et al. |
| 10,326,689 | B2 | 6/2019 | Liu et al. |
| 2007/0253329 | A1 | 11/2007 | Rooholamini et al. |
| 2012/0265910 | A1 | 10/2012 | Galles et al. |

(Continued)

FOREIGN PATENT DOCUMENTS

CN    109218177 B    6/2021

OTHER PUBLICATIONS

Co-pending U.S. Appl. No. 17/875,814, inventors Vijayan; Anoop et al., filed Jul. 28, 2022.

(Continued)

*Primary Examiner* — Than Nguyen
(74) *Attorney, Agent, or Firm* — Jaffery Watson Mendonsa & Hamilton LLP

(57) ABSTRACT

Multi-site distributed storage systems and computer-implemented methods are described for improving a resumption time for processing of input/output (I/O) operations during an automatic unplanned failover (AUFO). A first storage cluster includes a first set of consistency groups (CGs) and a second storage cluster includes a second mirrored set of CGs. A computer-implemented method includes prefetching, with a user space of the second storage cluster, configuration information from a replicated database prior to starting the AUFO workflow, sending the configuration information to a kernel space of the second storage cluster on a per CG level while queuing the AUFO workflow, and determining if any in progress workflows conflict with the AUFO workflow.

20 Claims, 11 Drawing Sheets

(56) References Cited

U.S. PATENT DOCUMENTS

| | | |
|---|---|---|
| 2013/0254599 A1 | 9/2013 | Katkar et al. |
| 2014/0189270 A1* | 7/2014 | Iwanicki ............... G06F 3/0619 |
| | | 711/162 |
| 2018/0095852 A1 | 4/2018 | Keremane et al. |
| 2018/0260125 A1* | 9/2018 | Botes .................. G06F 11/1662 |
| 2020/0112628 A1 | 4/2020 | Barszczak et al. |
| 2020/0133798 A1* | 4/2020 | Hu ......................... G06F 3/0619 |
| 2020/0409810 A1 | 12/2020 | Wu et al. |
| 2022/0086237 A1 | 3/2022 | Devireddy et al. |
| 2022/0189615 A1 | 6/2022 | Yu et al. |

OTHER PUBLICATIONS

Co-pending U.S. Appl. No. 17/875,837, inventors Vijayan; Anoop et al., filed Jul. 28, 2022.

Dawgsfan., "High Availability—HA Heartbeat Backup", by Dawgs Fan, Almargaris, 2022, at Palo Alto Networks—https://live.paloaltonetworks.com/t5/best-practice-assessment-device/high-availability-ha-heartbeat-backup/ta-p/338210.

Non-Final Office Action mailed on Dec. 11, 2023 for U.S. Appl. No. 17/875,814, filed Jul. 28, 2022, 24 pages.

\* cited by examiner

METHODS AND SYSTEMS TO IMPROVE
RESUMPTION TIME OF INPUT/OUTPUT
(I/O) OPERATIONS BASED ON
PREFETCHING OF CONFIGURATION DATA
AND EARLY ABORT OF CONFLICTING
WORKFLOWS DURING A NON-DISRUPTIVE
AUTOMATIC UNPLANNED FAILOVER
FROM A PRIMARY COPY OF DATA AT A
PRIMARY STORAGE SYSTEM TO A
MIRROR COPY OF THE DATA AT A
CROSS-SITE SECONDARY STORAGE
SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2022, NetApp, Inc.

FIELD

Various embodiments of the present disclosure generally relate to multi-site distributed data storage systems. In particular, some embodiments relate to improving resumption time for handling of I/O operations based on prefetching of configuration data and early abort of conflicting workflows during a non-disruptive automatic unplanned failover from a primary storage system to a secondary mirrored storage system.

DESCRIPTION OF THE RELATED ART

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise. Failures handled manually with user intervention require additional time to restore operations of the business enterprise.

SUMMARY

Multi-site distributed storage systems and computer-implemented methods are described for improving a resumption time of input/output (I/O) operations during an automatic unplanned failover (AUFO). A first storage cluster includes a first set of consistency groups (CGs) and a second storage cluster includes a second mirrored set of CGs. A computer-implemented method includes prefetching, with a user space of the second storage cluster, configuration information from a replicated database prior to starting the AUFO workflow, sending the configuration information to a kernel space of the second storage cluster on a per CG level while queuing the AUFO workflow, and determining if any in progress workflows conflict with the AUFO workflow.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
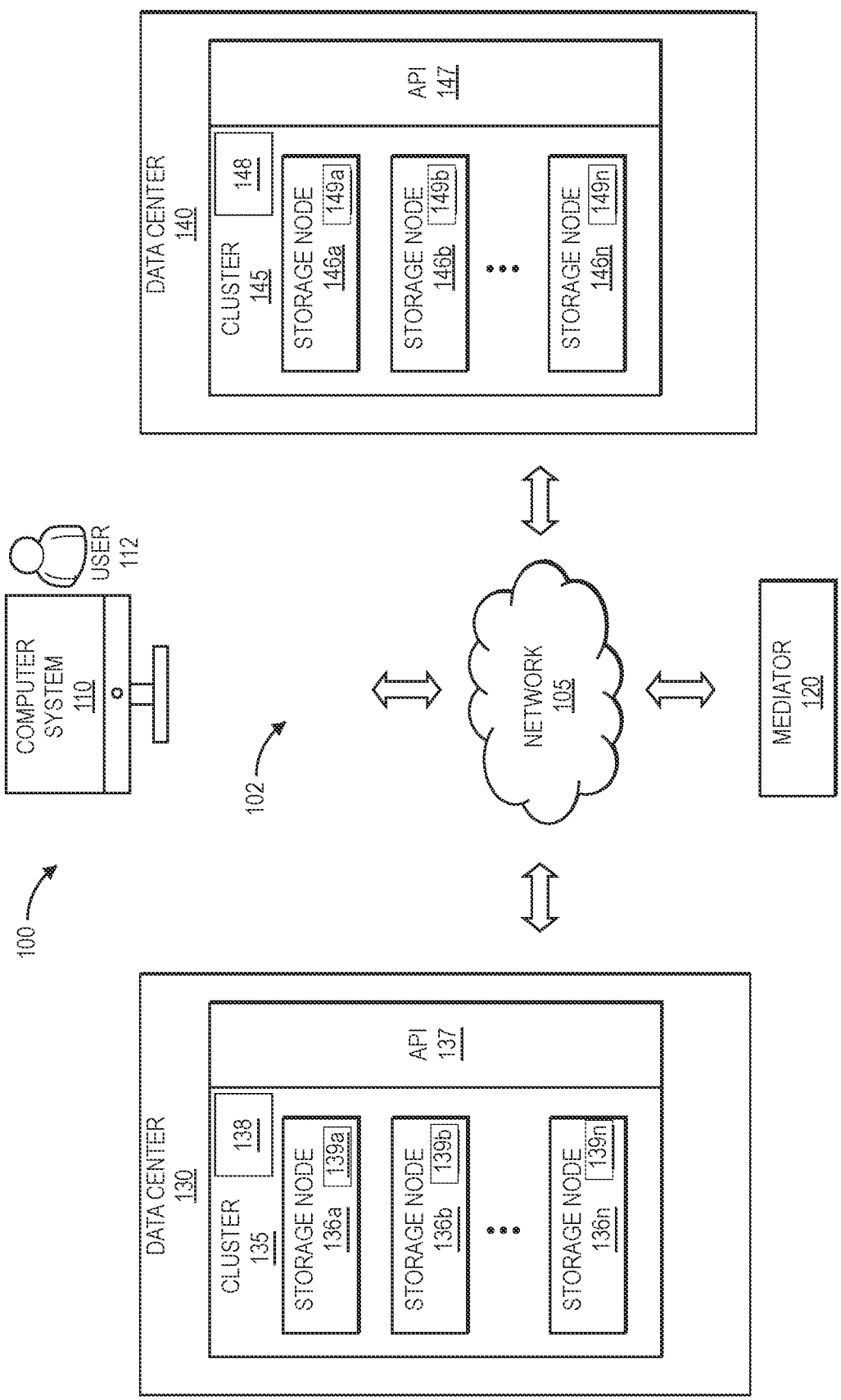
FIG. 1 is a block diagram illustrating an environment in which various embodiments may be implemented.

Multi-site distributed storage systems and computer-implemented methods are described for improving resumption time for processing of input/output (I/O) operations for an application during a non-disruptive automatic unplanned failover (AUFO) from a primary storage system to a secondary mirrored storage system to guarantee non-disruptive operations (e.g., operations of business enterprise applications, operations of software applications) even in the presence of failures including, but not limited to, network disconnection between multiple data centers and failures of a data center or cluster.

A synchronous replication from a primary copy of data of a consistency group (CG) at a primary storage system at a first site (primary storage site) to a secondary copy of data at a secondary storage system of a second site (secondary storage site) can fail due to many reasons including inter cluster connectivity issues. These issues can occur if the secondary storage site can not differentiate between the primary storage site being down, in isolation, or just a network partition. A trigger for the automated failover is generated from a data path and if the data path is lost, can lead to disruption. For example, if the primary storage site is not operational or is isolated (e.g., network partition leading to both inter cluster connectivity and connectivity to an external Mediator are lost), then a data replication relationship (or relationship) between the primary and secondary storage sites guarantees non-disruptiveness due to allowing I/O operations to be handled with the secondary mirror copy of data of the second site.

A data replication relationship between a primary copy of data of a consistency group (CG) at a primary storage system at a first site (primary storage cluster) to a secondary copy of data at a secondary storage system of a second site (secondary storage cluster) provides a storage data protection solution that includes a transparent application failover across two clusters. An application can be provisioned on a set of data containers or volumes on the primary storage cluster and these data containers or volumes can be grouped together to form a consistency group (CG) and be synchronously replicated to the secondary cluster. Upon a disaster on the primary storage cluster, like a power outage, network isolation or storage cluster loss, an Automatic Unplanned Fail Over (AUFO) workflow gets triggered to activate the secondary storage cluster to handle I/O operations for the application. The application services remain undisrupted as the I/O operations can seamlessly switchover to the secondary storage cluster and continue to access its data for the application without any loss. This latency, i.e., the time between I/O operations of the application stalling due to primary storage unavailability and resuming using the secondary storage as part of the AUFO, is known as host I/O Resumption Time (IORT). A lower IORT (shorter latency) indicates that the application services are resumed faster, thus improving the user experience for the application.

The AUFO operation on the secondary storage cluster (or secondary storage cluster) involves processing of various events starting from detecting a disruption in a connection to the primary storage cluster and then followed by health checks to establish if the primary storage cluster is indeed unavailable. In the case where the primary storage cluster is not available to serve I/O operations for the application, an AUFO workflow is initiated to perform necessary operations on the secondary storage cluster to change various attributes of a mirror copy of data so that the mirror copy of data can actively serve the I/O operations. Since the storage solution is application granular, AUFO processing happens for each CG, and the latency incurred is a function of a number of CGs participating in the failover. Thus, a greater number of CGs will have higher IORT, resulting in the application taking more time to resume its services on the secondary storage cluster. In a worse case, if the latency exceeds the timeouts supported by storage networking protocols, then this renders the failover disruptive to application services instead of the failover being seamless. This innovation reduces the IORT caused by various delays. The following delays or latencies contribute to the IORT.

A delay incurred in the detection of a primary cluster failure or connection loss to primary cluster contributes to the IORT. The secondary storage cluster's trigger for initiating a health-check of the primary storage cluster is an out-of-sync (OOS) notification from a data transfer engine (TE) that a transfer engine session is broken between primary and secondary clusters due to inter-cluster (or inter-cluster) heartbeat communication miss. The lower the heartbeat interval, which is a time period between heartbeat communications, and fewer the number of attempts, the earlier is the detection of a failure of the primary storage cluster. But lowering of the heartbeat interval has side-effects like disrupting the transfer engine session upon transient networking events, like a logical network interface (LIF) migration to a different port, leading the relationship between a storage object of the primary storage cluster and a mirrored storage object of the secondary storage cluster to go out-of-sync. The challenge for reducing IORT is to use an ultra-short heartbeat interval, and yet make the storage system resilient to the transient network events.

Latency due to serial heath-check operations also contributes to the IORT. A set of health check operations are executed to conclusively determine a primary cluster's health and availability. These health check operations involve long poll operations to the primary storage cluster via an external mediator (e.g., poll operations can be a process running in an external Linux Virtual Machine in a different cluster), and internet control message protocol (ICMP) ping and data ping to the primary storage cluster via multiple inter-cluster channels between each storage node of primary and secondary storage clusters. All such operations have a finite time-out associated with these operations, which will come into play when the primary storage cluster is not available and adds to the IORT.

Latency overhead due to redundant operations also contributes to IORT. The health check operations for the primary storage cluster happen in the context of the OOS notification of a particular CG and constitutes a significant portion of the IORT. Performing the health check operation for each CG will have a cascading delay effect. Thus, the last CGs being processed will end up taking more time as these CGs must wait for health checks of multiple other CGs to complete before these CGs can perform their own, thereby increasing the IORT.

Latency at scale because of system resource contention due to serialization points from parallel processing of different CGs also contributes to IORT. Once the health checks determine the primary storage cluster to have a failure and be non-operational or 'down', the mirror copies on the secondary cluster are made available for active I/O operations of the application. This is achieved by running an AUFO workflow on the secondary storage cluster. The AUFO workflow includes various events like changing the CG role in an external Mediator, updating the relationship state (e.g., in-sync state, out of sync state) in a persistent Replicated Data Base (RDB) of a storage cluster, changing read-only volumes of the secondary storage cluster to read write (RW), setting the a consensus to allow I/O operations on the storage volumes, converting the SCSI attributes of LUNs on the storage volumes, and so on. Since this processing for the AUFO workflow happens in parallel for each CG in different thread contexts, this processing leads to contention for system resources like processing resources (e.g., CPU), memory, database transactions, network devices, etc. Thus, the average IORT per CG is proportional to the total number of CGs participating in the failover.

Overhead due to system calls and context switches also contribute to IORT. Some of the operations like initializing a kernel of an operating system (OS) for an AUFO workflow requires the CG configuration information to be fetched from the RDB in a user space. A modern computer system typically segregates virtual memory into user space and kernel space. This separation serves to provide memory protection and hardware protection from malicious or errant software behavior. Kernel space is reserved for running a privileged operating system kernel, kernel extensions, and most device drives. In contrast, user space is a memory area where application software and other drivers execute. User space can refer to code in an OS that exists outside of the kernel.

Such operations like initializing a kernel result in system calls (e.g., kernel space to user space and vice versa) and unnecessary context switches can have long delays and add to the latency for the IORT. A context switch is the process of storing the state of a process or thread, so that the state can be restored and resume execution of the process or thread at a later point, and then restoring a different, previously saved, state. This allows multiple processes to share a single central processing unit (CPU), and is an essential feature of a multitasking operating system. In a multitasking context, context switching refers to the process of storing the system state for one task, so that task can be paused and another task resumed. A context switch can also occur as the result of an interrupt, such as when a task needs to access disk storage, freeing up CPU time for other tasks. Some operating systems also require a context switch to move between user mode and kernel mode tasks. The process of context switching can have a negative impact on system performance.

Latency due to conflicting workflows also contributes to IORT. It is possible that another workflow (e.g., fast resync workflow, scheduled common snapshot, planned failover, etc.) is in progress on a secondary mirrored storage object while the AUFO workflow is being started. For example, a fast-resync workflow may be started upon the out of sync state notification being received in order to return the relationship between a storage object of the primary storage cluster and the mirrored storage object back in sync. Since only one workflow is allowed to run on a constituent storage object (e.g., storage volume, data container) at a time, the conflicting workflow can prevent the AUFO workflow from being started. Hence, in this example, the fast-resync workflow should be aborted first and terminated before the AUFO workflow can start. In particular, the fast-resync workflow may be stuck on a blocking call like trying to establish a cluster session to the primary storage cluster. If the primary storage cluster is unreachable, this method can take a long time period (e.g., up to 50 seconds) to return with a failure, which is an unacceptable delay for AUFO.

As such, embodiments described herein seek to improve the IORT during an AUFO workflow. Various embodiments of the present technology provide for a wide range of technical effects, advantages, and/or improvements to multi-site distributed storage systems and components. Multiple techniques are utilized to improve the efficiency of various operations involved in failover processing and are listed below. These optimizations combined help reduce the failover latency, thereby improving the host IORT.

For example, various embodiments may include one or more of the following technical effects, advantages, and/or improvements for reducing IORT: (i) early detection of primary storage site failure using ultra-short heartbeats, (ii) optimizing primary health check operations using multi-level parallelization, (iii) avoiding redundant operations using cache, (iv) reducing contention due to serialization bottlenecks by batching or consolidating multiple similar or non-conflicting operations across different CGs and volumes into a single operation, (v) optimization by minimizing system calls and context switches by prefetching, and (vi) facilitating early-abort of conflicting workflows.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes a configuration database 138, multiple storage nodes 136a-n each having a respective mediator agent 139a-n, and an Application Programming Interface (API) 137. In the context of the present example, the multiple storage nodes 136a-n are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136a-n may be distributed across multiple storage units embodied as persistent storage devices, including but not limited to HDDs, SSDs, flash memory systems, or other storage devices. In a similar manner, cluster 145 includes a configuration database 148, multiple storage nodes 146a-n each having a respective mediator agent 149a-n, and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
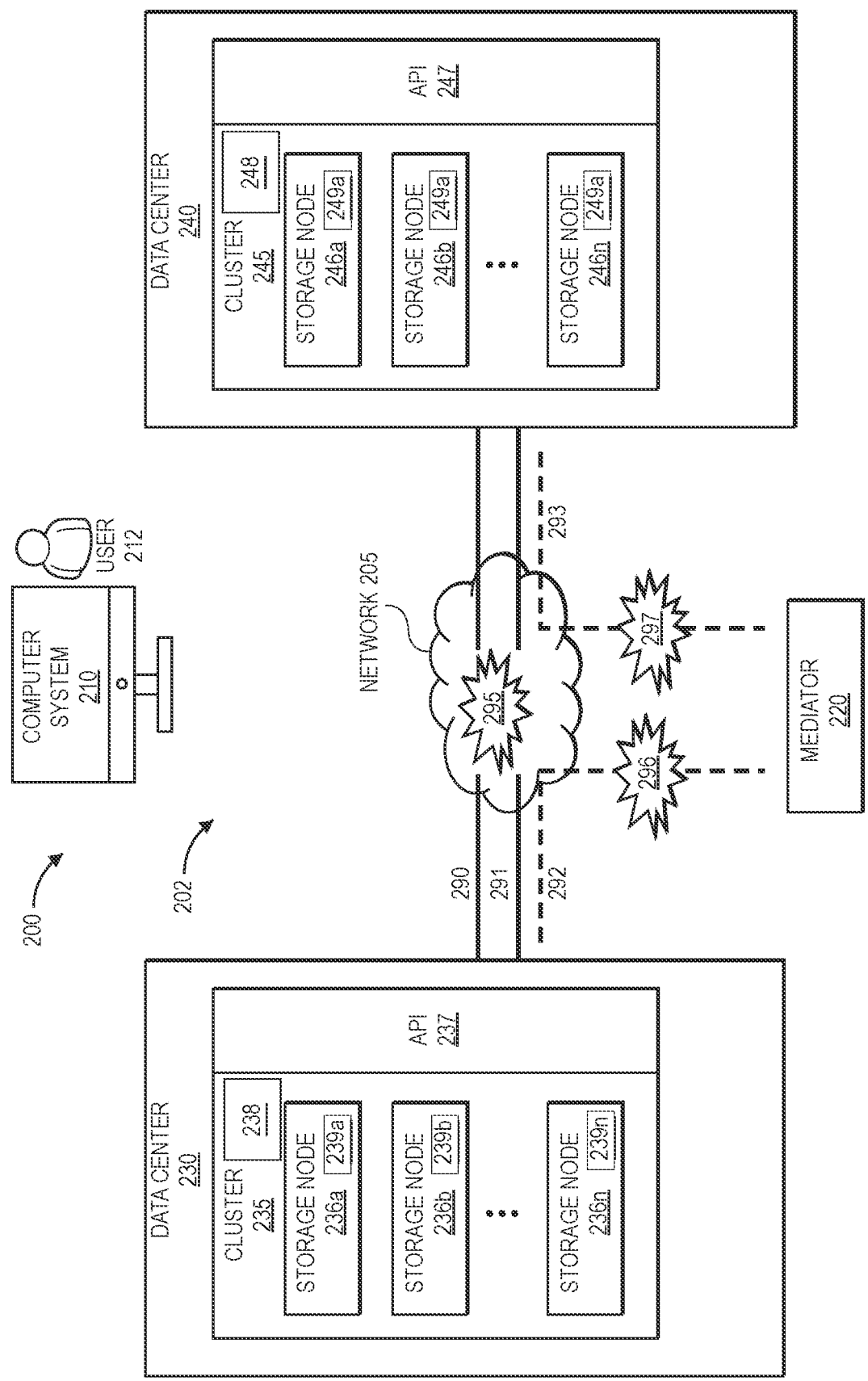
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236a-b, optionally includes additional storage nodes (e.g., 236n) and an Application Programming Interface (API) 237. The storage nodes 236a-n each include a respective mediator agent 239a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246a-b, optionally includes additional storage nodes (e.g., 246n) and includes an Application Programming Interface (API) 247. The storage nodes 246a-n each include a respective mediator agent 249a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operational (or isolation), or just a network partition. A trigger for the automated failover is generated from a data path and if the data path is lost, this can lead to disruption. A data replication relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure in a cluster hosting the secondary mirror copy of the data. The automatic unplanned failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The unplanned failover feature allows switching storage access from a primary copy of the data center 230 to a mirror copy of the data center 240 or vice versa.

Figure 3:
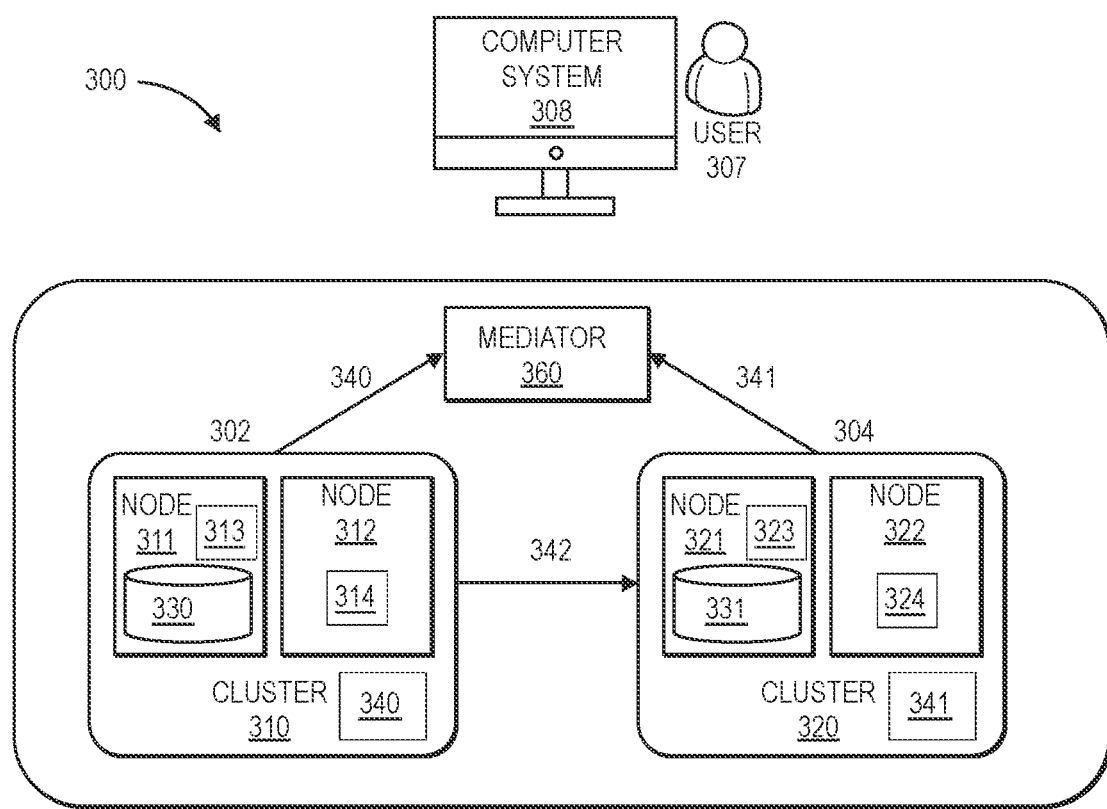
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360.

The multi-site distributed storage system 300 provides correctness of data, availability, and redundancy of data. In one example, the node 311 is designated as a leader and the node 321 is designated as a follower. The leader is given preference to serve I/O operations to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O operations to requesting clients, then this forms a strong consensus.

The leader and follower roles for the clusters 310 and 320 help to avoid a split-brain situation with both of the clusters simultaneously attempting to serve I/O operations. For example, the leader may become unresponsive while a mediator detects this unresponsiveness to be a leader non-operational situation. The leader being non-operational can potentially cause a race between leader and follower copy both simultaneously attempting to obtain a consensus. However, only one of the leader and the follower should win the race and then be allowed to handle I/O operations. If this race is not prevented, it can result in the split-brain situation.

There are scenarios where both leader and follower copies can claim to be a leader copy. In one example, a follower cannot serve I/O until an AUFO happens. A leader doesn't serve I/O operations until the leader obtains a consensus.

The mediator agents (e.g., 313, 314, 323, 324) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 for a consistency group. The mediator agent provides services for various events (e.g., simultaneous events, conflicting events) generated in a business data replication relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
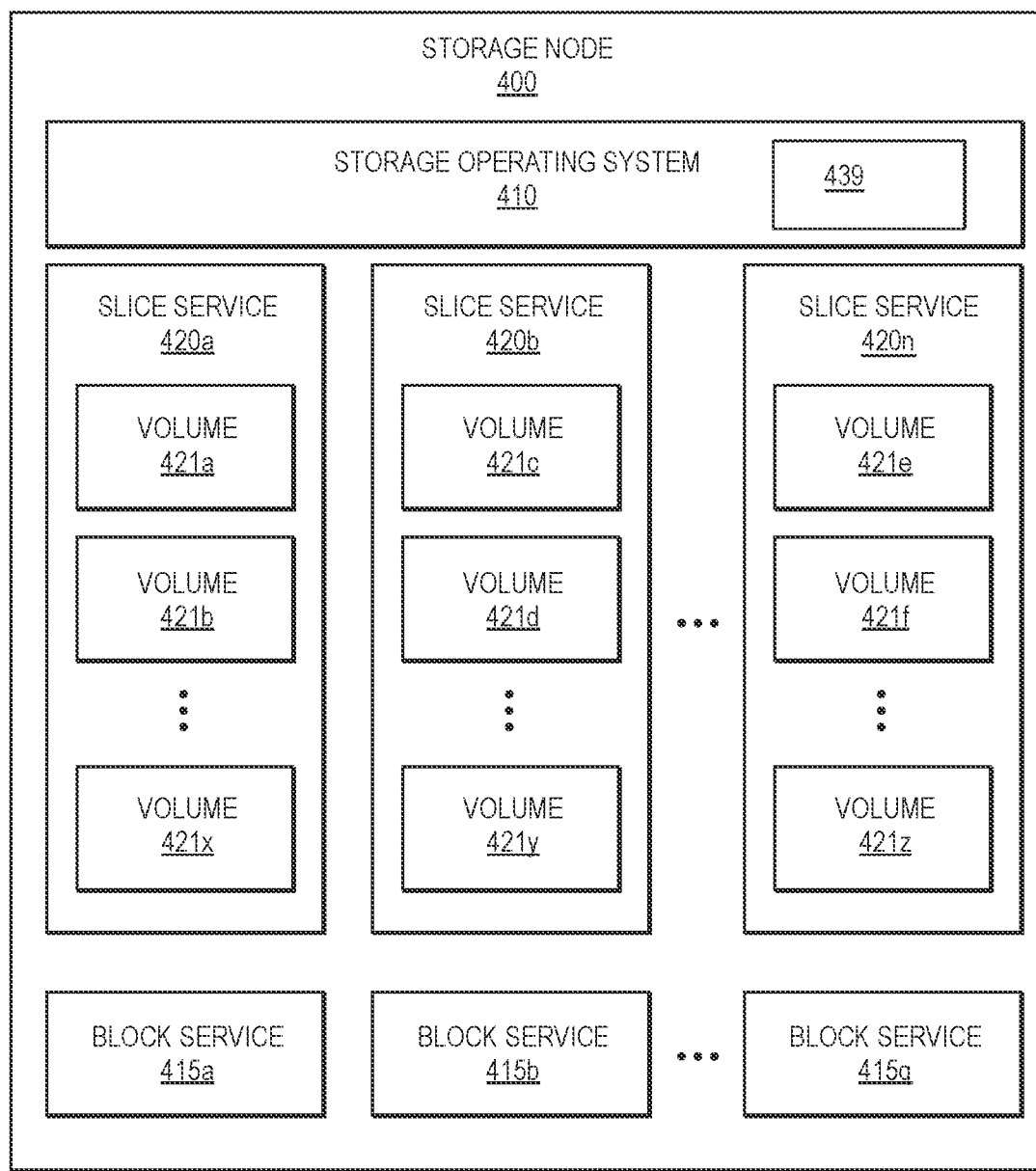
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 321, 322) described herein. In the context of the present example, a storage node 400 may be a network storage controller or controller that provides access to data stored on one or more volumes. The storage node 400 includes a storage operating system 410, a mediator agent 439, one or more slice services 420a-n, and one or more block services 415a-q. The mediator agent 439 can be separate or integrated with the storage operating system 410. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Figure 5:
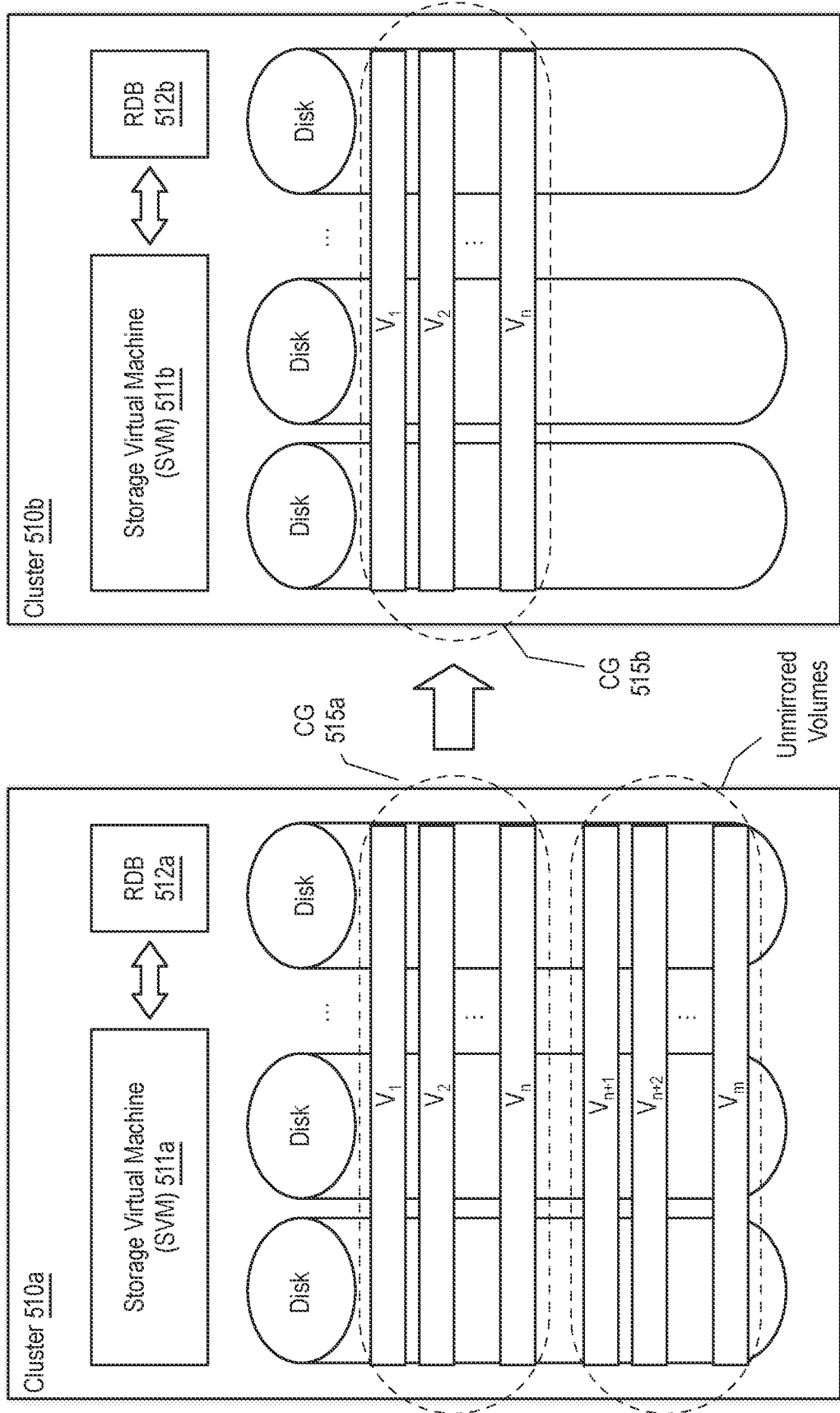
FIG. 5 is a block diagram illustrating the concept of a consistency group (CG) in accordance with an embodiment.

FIG. 5 is a block diagram illustrating the concept of a consistency group (CG) in accordance with an embodiment. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients.

SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information (e.g., relationship information of a data replication relationship) specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or leader cluster to a secondary or follower cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (leader) cluster is stored on more than one secondary (follower) cluster.

Figure 6A:
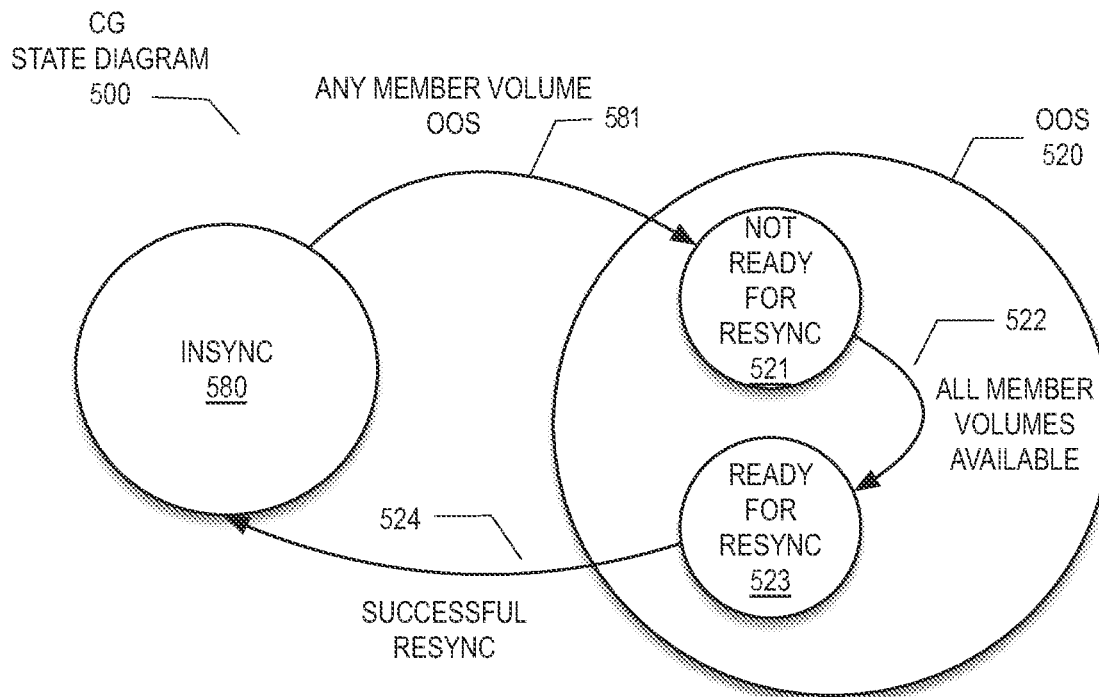
FIG. 6A is a CG state diagram 600 in accordance with an embodiment of the present disclosure.

FIG. 6A is a CG state diagram 500 in accordance with an embodiment of the present disclosure. In the context of the present example, the data replication status of a CG can generally be in either of an InSync state (e.g., InSync 580) or an OOS state (e.g., OOS 520). Within the OOS state, two sub-states are shown, a not ready for resync state 521 and a ready for resync state 523.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512a or 512b).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 581 from the InSync state to the not ready for resync state 521 of the OOS state responsive to any member volume of the CG becoming OOS with respect to a peer volume with which the member volume is peered. A given CG may transition 522 from the not ready for resync state 521 to the ready for resync state 523 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 524 from the ready for resync state 523 to the InSync state.

Although outside the scope of the present disclosure, for completeness it is noted that additional state transitions may exist. For example, in some embodiments, a given CG may transition from the ready for resync state 523 to the not ready for resync state 521 responsive to unavailability of a mediator (e.g., mediator 120) configured for the given CG. In such an embodiment, the transition 522 from the not ready for resync state 521 to the ready for resync state 523 should additionally be based on the communication status of the mediator being available.

Figure 6B:
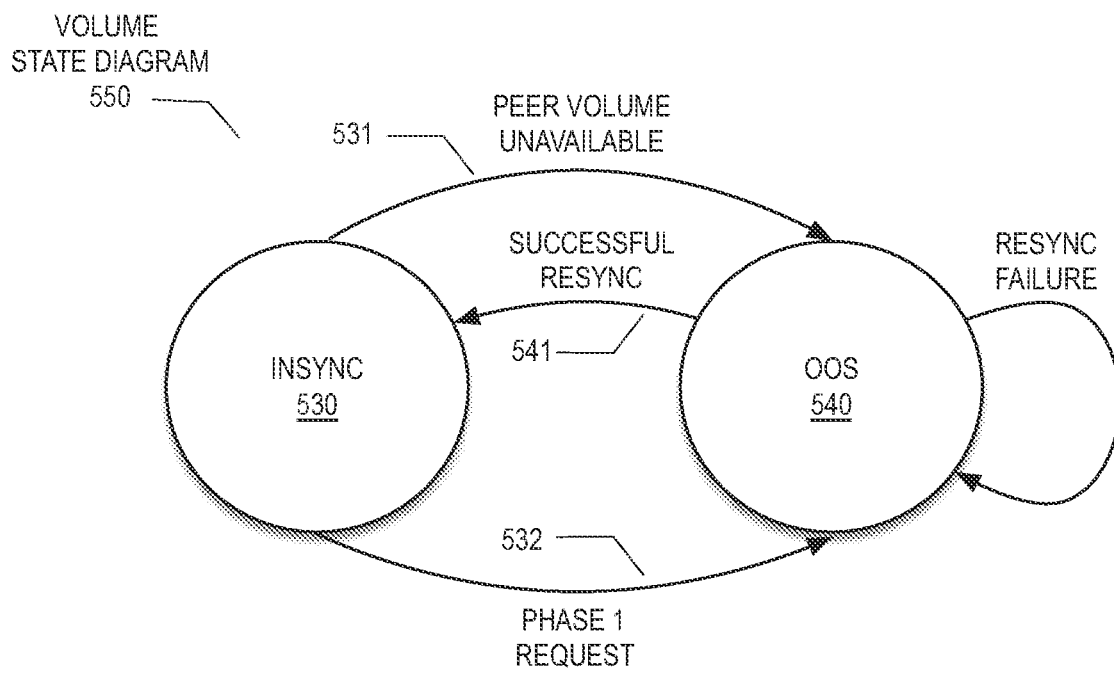
FIG. 6B is a volume state diagram 650 in accordance with an embodiment of the present disclosure.

FIG. 6B is a volume state diagram 550 in accordance with an embodiment of the present disclosure. In the context of the present example, the data replication status of a volume can be in either of an InSync state (e.g., InSync 530) or an OOS state (e.g., OOS 540). While a given volume of a local CG (e.g., CG 515a) is in the InSync state, the given volume may be said to be in-synchronization with a peer volume of a remote CG (e.g., CG 515b) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512a or 512b).

A given volume may transition 531 from the InSync state to the OOS state responsive to a peer volume being unavailable. A given volume may transition 541 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS.

Figure 7:
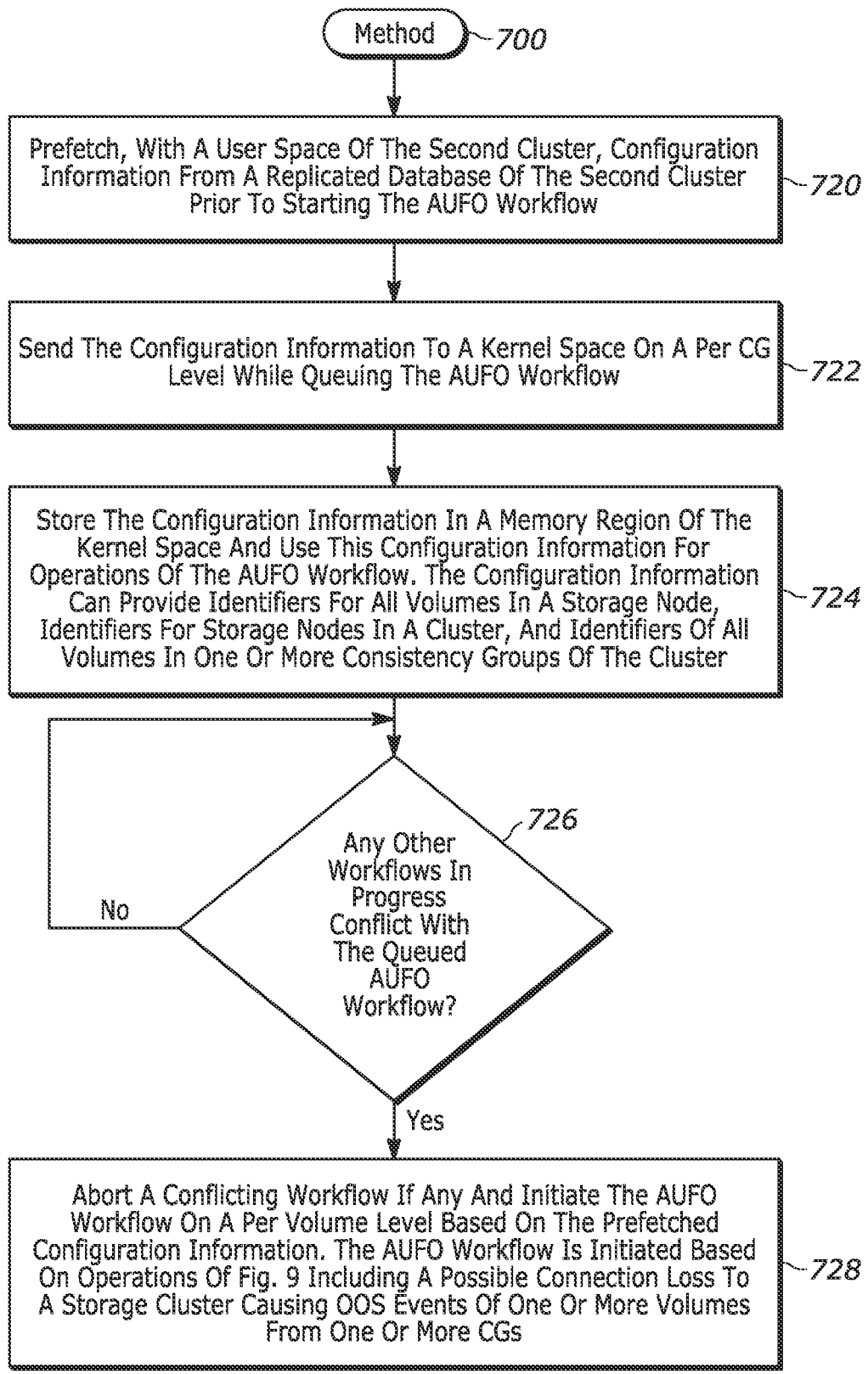
FIG. 7 illustrates a computer-implemented method of operations for reducing IORT based on prefetching of configuration data and early abort of conflicting workflows (e.g., conflicting operations) during an AUFO in accordance with one embodiment of the present disclosure.
Figure 8:
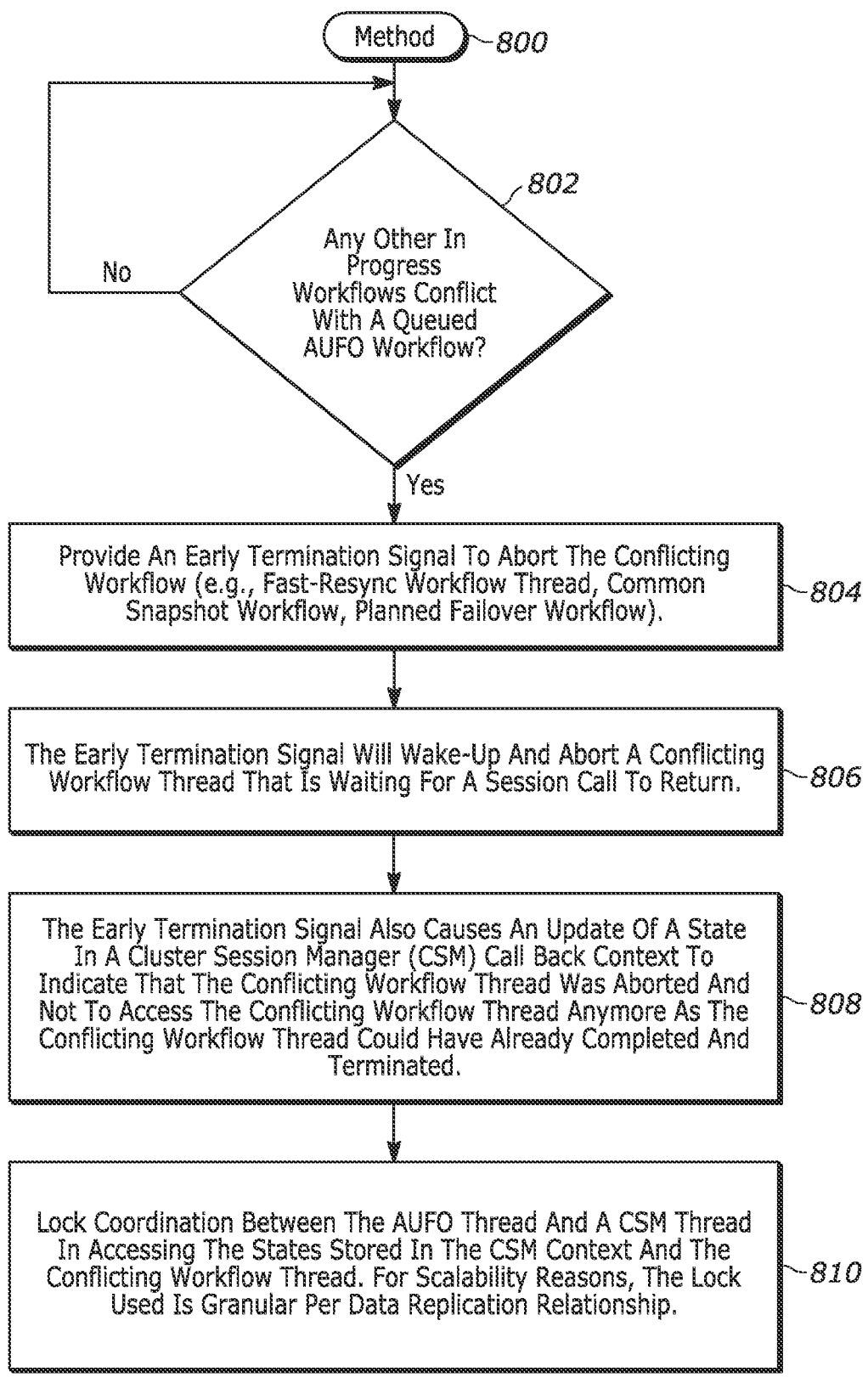
FIG. 8 illustrates a computer-implemented method for early abort of conflicting workflows (e.g., conflicting operations) during automatic unplanned failover (AUFO) processing in accordance with an embodiment of the present disclosure.

FIGS. 7-9 are flow diagrams illustrating computer-implemented methods of operations for reducing IORT during an automatic unplanned failover (AUFO) that provides non-disruptiveness in presence of failures in accordance with an embodiment of the present disclosure. This AUFO feature of the present design provides an order of operations such that a primary copy of data at a primary storage site continues to serve I/O operations until a mirror copy of the data at secondary storage site is ready. This AUFO feature provides non-disruptiveness during unplanned failover—in presence of various failures. The AUFO feature also avoids a split-brain situation by the way of a strong consensus (e.g., strong consensus in a PAXOS instance) based on having the primary copy of the data at the primary storage site, a mirror copy of the data at the secondary storage site, and an external mediator at a third site.

FIG. 7 illustrates a computer-implemented method of operations for reducing IORT based on prefetching of configuration data and early abort of conflicting workflows (e.g., conflicting operations) during an AUFO in accordance with one embodiment of the present disclosure. Although the operations in the computer-implemented method 700 are shown in a particular order, the order of the actions can be modified. Thus, the illustrated embodiments can be performed in a different order, and some operations may be performed in parallel. Some of the operations listed in FIG. 7 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 700 may be executed by a storage controller, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes the primary storage site having a first cluster with y consistency groups. The y consistency groups of the first cluster are assigned a leader role for one or more primary copies of data. A second cluster of the secondary storage site has y' consistency groups with one or more mirrored copies of the data. The y' consistency groups of the second cluster are assigned a follower role.

The AUFO workflow can be optimized by minimizing system calls (e.g., kernel space to user space calls, user space to kernel space calls) and context switches of processing resources by prefetching. The system calls and context switch communications can be reduced by prefetching and storing information early in the workflow rather than fetching on demand. For example, instead of the AUFO workflow in the kernel space for an OS of the second cluster making a separate call to a user application of user space to fetch some configuration information during the AUFO workflow, the user space of the second cluster can prefetch the configuration information from a replicated database of the second cluster prior to starting the AUFO workflow at operation 720. The method includes sending the configuration information to the kernel space at operation 722 on a per CG level while queuing the AUFO workflow. At operation 724, the kernel space (or control component) can store (e.g., cache) that information in a memory region and use this information whenever the workflow needs this configuration information without needing context switches (e.g., context switch between user space and kernel space, context switch to a different thread of a different processing resource).

The configuration information can provide identifiers for all volumes in a storage node, identifiers for storage nodes in a cluster, and identifiers of all volumes in one or more consistency groups of the cluster.

At operation 726, the kernel space can determine if any other workflows in progress conflict with the queued AUFO workflow. If not, then the method returns to operation 726.

If so, then at operation 728 the method includes aborting a conflicting workflow if any and initiating the AUFO workflow on a per volume level based on the prefetched configuration information. The AUFO workflow is initiated based on operations of FIGS. 9A and 9B including a possible connection loss to a storage cluster causing OOS events of one or more volumes from one or more CGs as described at operation 923 of FIG. 9A. FIG. 8 provides additional details of the early aborting of a conflicting workflow.

FIG. 8 illustrates a computer-implemented method for early abort of conflicting workflows (e.g., conflicting operations) during automatic unplanned failover (AUFO) processing in accordance with an embodiment of the present disclosure. Although the operations in the computer-implemented method 800 are shown in a particular order, the order of the actions can be modified. Thus, the illustrated embodiments can be performed in a different order, and some operations may be performed in parallel. Some of the operations listed in FIG. 8 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 800 may be executed by a storage controller, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

The method 800 facilitates an early abort of any workflow that conflicts with an AUFO workflow. A conflicting workflow can be a fast resynchronization for a data replication relationship between a first storage object of a first CG of a first cluster and a peered second storage object of a second CG of a second cluster. Other conflicting workflows include a common snapshot workflow and a planned failover workflow. A common snapshot workflow can perform a common snapshot copy on a periodic basis (e.g., every 1 hour, every 12 hours) to ensure that the first and second storage objects store the same content. Fast resynchronization is more likely to collide with AUFO almost every time because a connection loss to a primary cluster triggers the workflow for both fast resynchronization and AUFO in parallel.

At operation 802, a kernel space (e.g., kernel space that includes kernel of an OS) of the second cluster can determine if any other in progress workflows conflict with a queued AUFO workflow. If not, then the method returns to operation 802.

If so, then at operation 804 a special early termination signal is introduced to abort the conflicting workflow (e.g., fast-resync workflow, common snapshot workflow, planned failover workflow). At operation 806, the early termination signal will wake-up and abort a conflicting workflow thread that is waiting for a session call to return information. At operation 808, the early termination signal also causes an update of a state in a cluster session manager (CSM) call back context to indicate that the conflicting workflow thread was aborted and not to access the conflicting workflow thread anymore as the conflicting workflow thread could have already completed and terminated.

At operation 810, the method further includes locking coordination between the AUFO thread and a CSM thread in accessing the states stored in the CSM context and the conflicting workflow thread. For scalability reasons, the lock used is granular per data replication relationship. In one example, this is achieved with two level locking. One lock is maintained in the CSM context and the other lock in the conflicting workflow thread.

A lock is an abstraction that allows at most one thread to own the lock at a time. Locks have acquire or release operations. An acquire operation allows a thread to take ownership of a lock. If a thread tries to acquire a lock currently owned by another thread, it blocks until the other thread releases the lock. At that point, it will contend with any other threads that are trying to acquire the lock. At most one thread can own the lock at a time. A release operation relinquishes ownership of the lock, allowing another thread to take ownership of it.

Figure 9A:
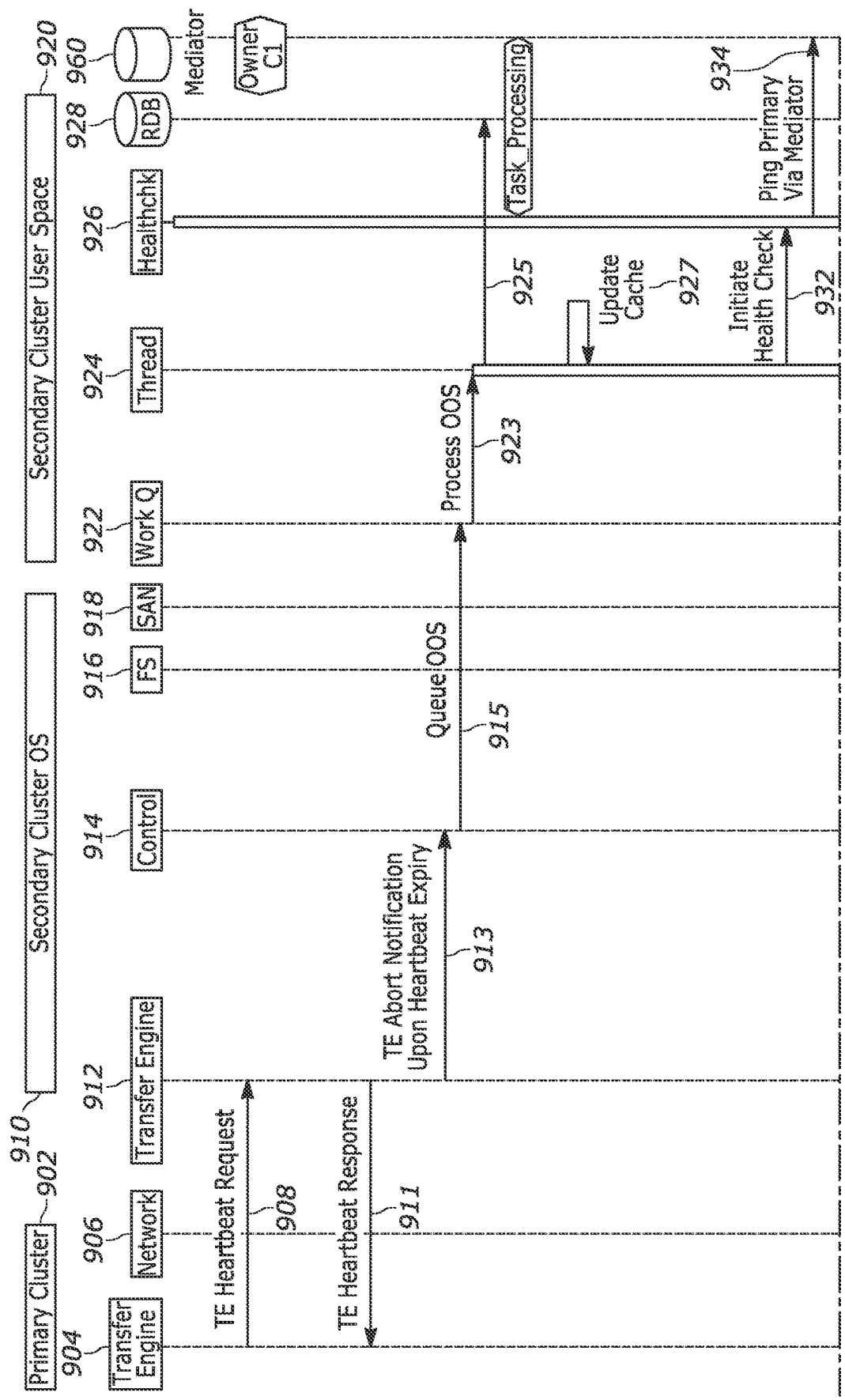
FIGS. 9A-9B illustrate operations for reducing IORT during an automatic unplanned failover (AUFO) that provides non-disruptiveness in presence of failures in accordance with an embodiment of the present disclosure.
Figure 9B:
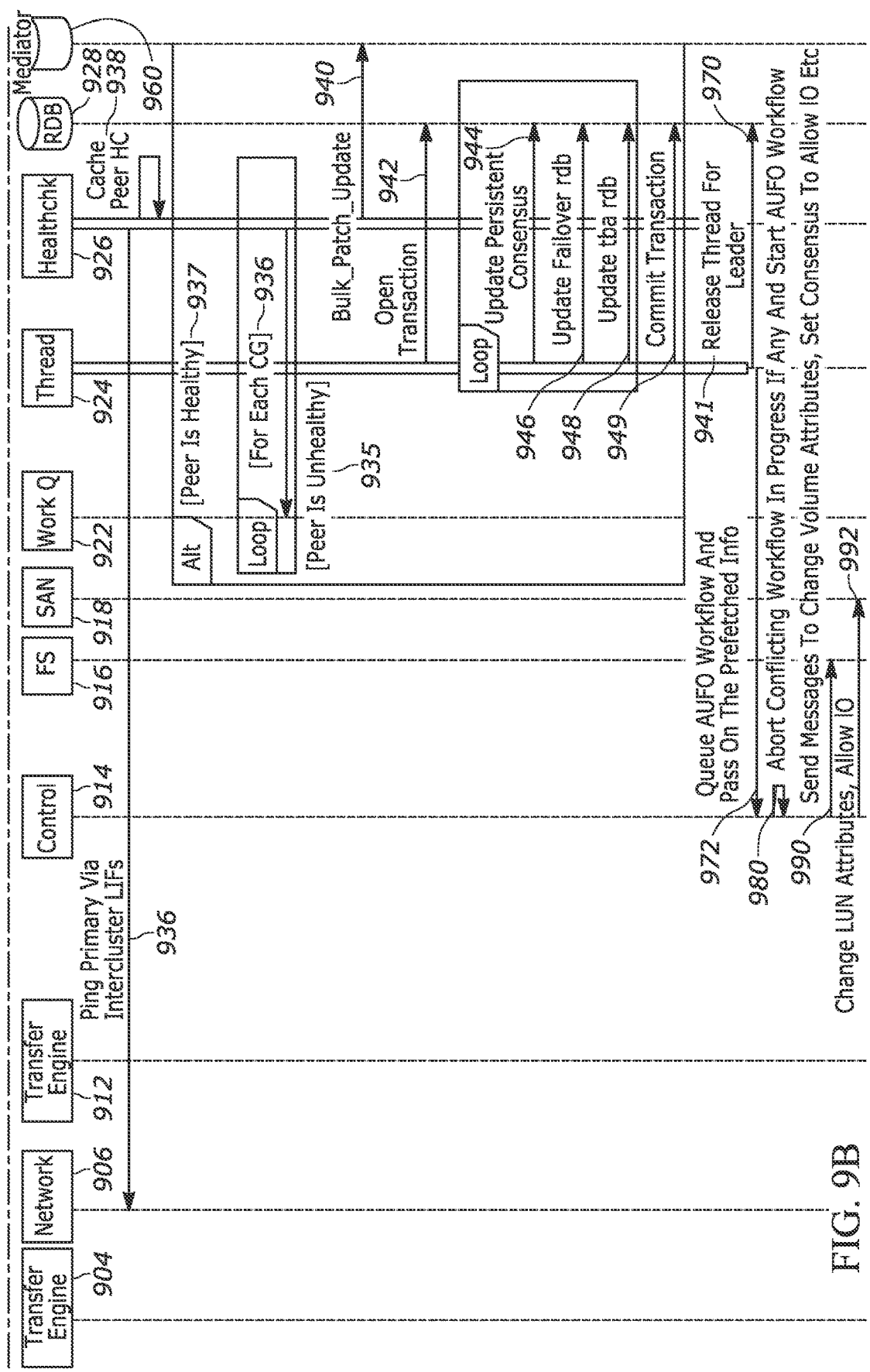

FIGS. 9A-9B illustrate operations for reducing IORT during an automatic unplanned failover (AUFO) that provides non-disruptiveness in presence of failures in accordance with an embodiment of the present disclosure. This AUFO feature of the present design provides an order of operations such that a primary copy of data at a primary storage site continues to serve I/O operations until a mirror copy of the data at secondary storage site is ready.

Although the operations in FIGS. 9A-9B are shown in a particular order, the order of the actions can be modified. Thus, the illustrated embodiments can be performed in a different order, and some operations may be performed in parallel. Some of the operations listed in FIGS. 9A-9B are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of FIGS. 9A-9B may be executed by a storage controller, a storage virtual machine (e.g., SVM 511a, SVM 511b), a mediator (e.g., mediator 120, mediator 220, mediator 360), a mediator agent (e.g., mediator agent 139a-139n, mediator agent 149a-149n, mediator agent 239a-239n, mediator agent 249a-249n, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes the primary storage site having a first cluster with a primary copy of data in a consistency group (CG1). The consistency group of the first cluster is assigned a leader role. A second cluster of the secondary storage site has a secondary mirror copy of the data in a consistency group. The consistency group of the second cluster (CG2) is assigned a follower role. The first cluster may include intercluster LIFs A1 and A2 while the second cluster includes intercluster LIFs B1 and B2. A1 communicates with B1 and B2. A2 communicates with B1 and B2.

FIGS. 9A-9B illustrates a primary cluster 902 (or first cluster) including a transfer engine component 904 and a network component 906. A secondary cluster OS 910 (or second cluster OS) includes a transfer engine component 912, a control component 914, a file system 916, and a storage area network (SAN) component 918. A secondary cluster user space 920 (or second cluster user space) includes a work queue 922 of a mediator agent, a mediator agent thread 924, a health check component 926, and a replicated database 928. A mediator 960 is external and separate from the primary and secondary clusters. The mediator 960 initially sets the primary cluster 902 as owner to handle I/O operations.

At operation 908, the transfer engine 904 sends heartbeat information (e.g., heartbeat signal, heartbeat message) to the transfer engine 912, which monitors heartbeat information received at an ultra-short time interval (e.g., interval less than one second, interval of approximately 0.5 seconds with approximately being +/−10% of a value) from a connection of the first cluster on a per storage object basis. In other words, each storage object (e.g., volume, data container) of the first cluster can send a heartbeat message.

At operation 911, the transfer engine 912 sends a heartbeat response to the transfer engine 904 based on the received heartbeat information if any. The transfer engine 912 continues monitoring heartbeat information.

In one example, consider a transfer engine of the first cluster that is sending heartbeat signals at an ultra-short time interval (e.g., 3 signals sent at an interval of approximately 0.5 seconds for an ultra-short Heartbeat) to the second cluster. Further consider that the logical network interface (LIF) through which the heartbeat signal is being sent is migrating to another port. A Cluster Session Manager (CSM) maintains a pool of connections between the first and second clusters. These connections are distributed over multiple inter-cluster LIFs. If a connection drops a packet and must go through the slow-start process, the connection could have a delay long enough to timeout the round-trip time specified (e.g., 0.5 second round-trip time specified). This is handled by intelligently routing the heartbeat messages via other connections in the CSM pool when a first heartbeat message incurs a time-out. For example, when the first heartbeat message incurs a time-out as the LIF is failing over to a different port, CSM will send a response to the transfer engine (TE) 904 with a time-out error message. The transfer engine 904 upon receiving this will send the next heartbeat via another connection over a different LIF-pair.

If heartbeat information is not received during the time period for the predetermined number of attempts (e.g., 2 to 4 attempts), then the first storage cluster or primary storage site is considered to be non-operational (or potentially non-operational) and the transfer engine 912 of the second cluster will issue an abort notification 913 upon expiration of the time period with no heartbeat information being received during this time period. At operation 915, an out of sync (OOS) state is queued in queue 922 and at operation 923 the OOS state is processed by thread 924 of mediator agent of the second cluster. This operation includes initiating an out of sync (OOS) state for a data replication relationship between the first and second clusters when the secondary storage site fails to receive the heartbeat information from the first cluster during the time period (e.g., time period of 2 intervals, 3 intervals, 4 intervals, etc.). The OOS state may be based on OOS events of one or more volumes of the first cluster.

At operation 925, in response to detecting the OOS state, a mediator agent of the second cluster stores the OOS state that is associated with a heartbeat information event for a volume of a consistency group of the second cluster and also stores OOS state for any other volumes of the consistency group having the OOS state and associated heartbeat information events in the replicated database 928. An external mediator 960 is provisioned in a third site and configured on the first and second storage clusters as a mediator agent to act as an arbitrator towards handling of split brain scenarios and other failure cases including site failures. The OOS state can be stored in a replicated database of the second cluster. At operation 927, the updated OOS state is stored in a cache for the secondary cluster.

Next, at operation 932, a mediator agent initiates a health check for the primary cluster. The mediator agents sends the initiate health check operation to the health check module 926. The health check operations are designed to determine whether the first cluster is non-responsive or responsive (available for I/O operations).

The health check operations are optimized by executing the health check in parallel multiple threads to effectively utilize most or all of the processing resources (e.g., a microcontroller, a microprocessor, central processing unit core(s), an application-specific integrated circuit (ASIC), a field programmable gate array (FPGA), and the like) available on most or all of the storage nodes. The health check operations include performing an external mediator-based health check and logical network interface (LIF) based heath check in parallel for a first level of parallelization. The health check module 926 sends a message at operation 934 to the external mediator 960 to cause a polling communication to be sent from the external mediator to all storage nodes of the first cluster and simultaneously the health check module sends one or more communications (e.g., internet control message protocol (ICMP) pings) at operation 936 to all intercluster LIFs (e.g., LIFs A1 and A2) of each storage node of the first cluster across connections (e.g., communication links) between the first cluster and second cluster.

The health check includes a second level of parallelization by running these health check operations simultaneously on all the storage nodes of the first cluster. The health check includes a third level of parallelization to run these health check operations simultaneously across all the LIFs on a specific node. The external mediator receives responses from one or more storage nodes that have been polled and the health check module receives one or more reply messages from available LIFs that have been pinged. Results of these health check operations are collated (e.g., collected and combined) to determine a health condition of the storage nodes and the LIFs of the primary cluster.

In one example, in case of a first cluster failure of the primary storage site, a result of the health check operation for all CGs of the primary cluster will be the same, i.e., the primary cluster is not healthy. Note that parallelizing operations across CGs in this case will be redundant and hence may not be the right technique to deal with this issue. Instead, the redundant operations are completely avoided by caching the result of the first CG's heath check at operation 938. Further CGs just consume this result instead of each one spending time performing its own health check.

Health check operations are not performed for additional CGs for peer is unhealthy 935. Rather, additional CGs utilize this result from the CG that indicates a failure. The health check module does not perform health check operations on the additional CGs.

If no failure is determined for the peer CG and the peer CG is healthy 937, then the health check module proceeds to perform health check operations 936 for additional CGs until a failure is determined and this result is cached at the second cluster.

The IORT can be reduced by batching communications to reducing contention due to serialization bottlenecks. The health check component 926 sends a bulk role change call 940 (e.g., bulk patch update 940) from the second cluster to the external mediator 960. The bulk role change call is a single call to provide a role change from follower to leader in all of the CGs for the second cluster (instead of needing a roll change call for each of the CGs of the second cluster). This single bulk role change call reduces network processing and processing of processing resources that would normally occur for each CG. In one example, the bulk role change call includes a list of CGs and a list of payload.

A message 942 is sent to a replicated database (RDB) 928 to open a new transaction with the RDB 928. The mediator agent sends update communications to the RDB 928. The RDB update communication is a single RDB update communication to provide an update (e.g., update persistent consensus 944, update failover status 946, update mediator agent status 948) in all of the CGs of the second cluster to the RDB (instead of needing an update communication for each of the CGs). This single RDB update communication reduces network processing and processing of processing resources that would normally occur for each CG. The message 949 commits a transaction to the RDB 928. At operation 941, the thread of the mediator agent is released.

The AUFO workflow can be optimized by minimizing system calls and context switches of processing resources by prefetching. The system call and context switch communications can be reduced by prefetching and storing information early in the workflow rather than fetching on demand. For example, instead of the AUFO workflow in the control 914 making a separate call to user space 920 to fetch some configuration information, the user space 920 can prefetch the required information at operation 970 and pass it to the control 914 at operation 972 while initiating the AUFO workflow. The workflow can store that information and use this information whenever the workflow needs without context switches.

At operation 980, the control 914 determine whether conflicting workflows are in progress and aborts a conflicting workflow while starting the AUFO workflow.

Multiple messages can be batched for storage volumes on a per node basis into a single message 992 to convert the LUN attributes of LUNs and allow I/O operations on the storage volumes of a cluster during the AUFO workflow. One of the events in the AUFO workflow changes the LUN attributes by notifying a storage area network (SAN) component 918 (e.g., virtual disk Object Manager) for storage volumes. These messages are batched at a node level and delivered as a single notification to the SAN component 918, which in turn processes this and responds back with a single call back message with a list of results for each volume. This improves the processing efficiency and reduces the call out and call back communications and processing overheads.

Also, a message handler of control component 914 can combine multiple non-conflicting messages (e.g., change volume attributes, set consensus to allow I/O operations) for file system operations on a per volume basis into a single message 990.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 10:
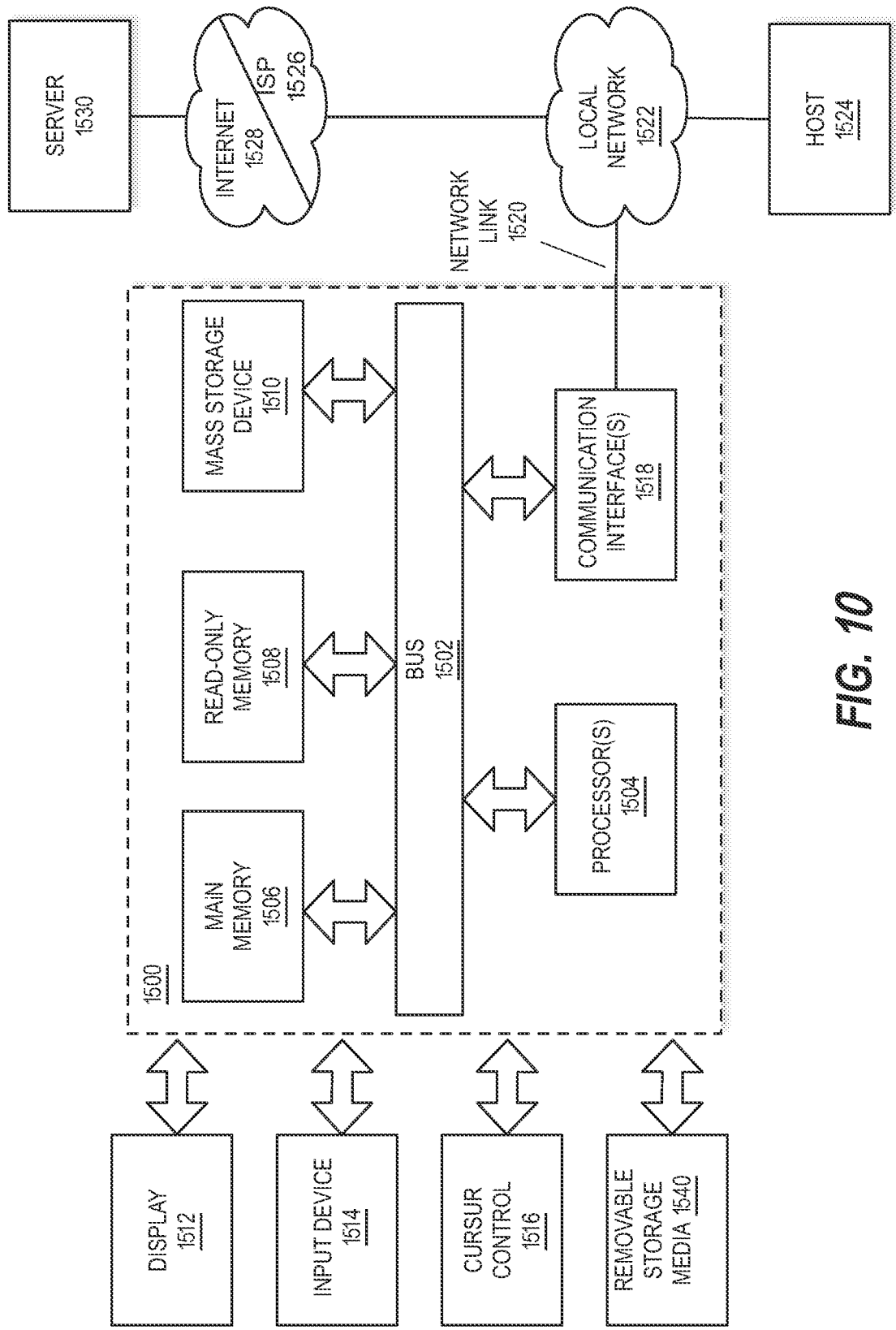
FIG. 10 illustrates an example computer system in which or with which embodiments of the present disclosure may be utilized.

FIG. 10 is a block diagram that illustrates a computer system 1500 in which or with which an embodiment of the present disclosure may be implemented. Computer system 1500 may be representative of all or a portion of the computing resources associated with a storage node (e.g., storage node 136a-n, storage node 146a-n, storage node 236a-n, storage node 246a-n, nodes 311-312, nodes 321-322, storage node 400), a mediator (e.g., mediator 120, mediator 220, mediator 360), or an administrative work station (e.g., computer system 110, computer system 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., processing logic, hardware processor(s) 1504) coupled with bus 1502 for processing information. Hardware processor 504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1118. In the Internet example, a server 1530 might transmit a requested code for an application program through Internet 1528, ISP 1526, local network 1522 and communication interface 1518. The received code may be executed by processor 1104 as it is received, or stored in storage device 1510, or other non-volatile storage for later execution.

What is claimed is:

1. A computer-implemented method performed by one or more processors of a multi-site distributed storage system with a first storage cluster having a first set of consistency groups (CGs) and a second storage cluster having a second mirrored set of CGs, the method comprising:
    prefetching, with a user space of the second storage cluster, configuration information from a replicated database prior to starting a non-disruptive automatic unplanned failover (AUFO) workflow;
    sending the configuration information to a kernel space on a per CG level while queuing the AUFO workflow; and
    determining if any in progress workflows conflict with the AUFO workflow to facilitate abort of any in progress workflows to reduce a resumption time of input/output (I/O) operations during the AUFO workflow.

2. The computer-implemented method of claim 1, further comprising:
    aborting a conflicting workflow if any workflows conflict with the AUFO workflow; and
    initiating the AUFO workflow based on the prefetched configuration information.

3. The computer-implemented method of claim 1, further comprising:
    storing the configuration information in a memory region of the kernel space and using this information for operations of the AUFO workflow.

4. The computer-implemented method of claim 1, wherein the configuration information comprises identifiers for all volumes of each consistency group in a storage node and identifiers for storage nodes in a storage cluster.

5. The computer-implemented method of claim 2, wherein aborting a conflicting workflow if any workflows conflict with the AUFO workflow comprises:
    performing a wake up and abort of a conflicting workflow thread of the conflicting workflow with the conflicting workflow thread waiting for a session call to return; and
    updating of a state in a cluster session manager (CSM) context to indicate that the conflicting workflow thread was aborted and not to access the conflicting workflow thread.

6. The computer-implemented method of claim 5, further comprising:
    locking coordination between an AUFO thread and a CSM thread in accessing states stored in the CSM context and the conflicting workflow thread.

7. The computer-implemented method of claim 1, wherein the conflicting workflow comprises a fast resynchronization workflow, a common snapshot workflow, or planned failover workflow.

8. A storage node of a multi-site distributed storage system having a primary storage site with a first cluster and a secondary storage site with a second cluster, the storage node comprising:
    a processing resource; and
    a non-transitory computer-readable medium coupled to the processing resource, having stored therein instructions, which when executed by the processing resource cause the processing resource to:

prefetch configuration information from a replicated database prior to starting an automatic unplanned failover (AUFO) workflow;

send the configuration information to a kernel space on a per consistency group (CG) level while queuing the AUFO workflow; and determine if any in progress workflows conflict with the AUFO workflow to facilitate abort of any in progress workflows to reduce a resumption time of input/output (I/O) operations during the AUFO workflow.

9. The storage node of claim 8, wherein the instructions when executed by the processing resource cause the processing resource to:

abort a conflicting workflow if any workflows conflict with the AUFO workflow; and initiate the AUFO workflow based on the prefetched configuration information.

10. The storage node of claim 8, wherein the instructions when executed by the processing resource cause the processing resource to:

store the configuration information in a memory region of the kernel space and using this information for operations of the AUFO workflow.

11. The storage node of claim 8, wherein the configuration information comprises identifiers for all volumes of each consistency group in a storage node and identifiers for storage nodes in a storage cluster.

12. The storage node of claim 8, wherein the instructions when executed by the processing resource cause the processing resource to:

perform a wake up and abort of a conflicting workflow thread of the conflicting workflow with the conflicting workflow thread waiting for a session call to return; and update of a state in a cluster session manager (CSM) context to indicate that the conflicting workflow thread was aborted and not to access the conflicting workflow thread.

13. The storage node of claim 12, wherein the instructions when executed by the processing resource cause the processing resource to:

lock coordination between an AUFO thread and a CSM thread in accessing the states stored in the CSM context and the conflicting workflow thread.

14. The storage node of claim 8, wherein the conflicting workflow comprises a fast resynchronization workflow, a common snapshot workflow, or planned failover workflow.

15. A non-transitory computer-readable storage medium embodying a set of instructions, which when executed by a processing resource of a storage cluster of a multi-site distributed storage system cause the processing resource to:

prefetch, with a user space of the storage cluster, configuration information from a replicated database prior to starting an automatic unplanned failover (AUFO) workflow;

send the configuration information to a kernel space on a per consistency group (CG) level while queuing the AUFO workflow; and determine if any in progress workflows conflict with the AUFO workflow to facilitate abort of any in progress workflows to reduce a resumption time of input/output (I/O) operations during the AUFO workflow.

16. The non-transitory computer-readable storage medium of claim 15, wherein the instructions when executed by the processing resource cause the processing resource to:

abort a conflicting workflow if any workflows conflict with the AUFO workflow; and initiate the AUFO workflow based on the prefetched configuration information.

17. The non-transitory computer-readable storage medium of claim 15, wherein the instructions when executed by the processing resource cause the processing resource to:

store the configuration information in a memory region of the kernel space and using this information for operations of the AUFO workflow.

18. The non-transitory computer-readable storage medium of claim 15, wherein the configuration information comprises identifiers for all volumes of each consistency group in a storage node and identifiers for storage nodes in the storage cluster.

19. The non-transitory computer-readable storage medium of claim 15, wherein the instructions when executed by the processing resource cause the processing resource to:

perform a wake up and abort of a conflicting workflow thread of the conflicting workflow with the conflicting workflow thread waiting for a session call to return; and update of a state in a cluster session manager (CSM) context to indicate that the conflicting workflow thread was aborted and not to access the conflicting workflow thread.

20. The non-transitory computer-readable storage medium of claim 15, wherein the instructions when executed by the processing resource cause the processing resource to:

lock coordination between an AUFO thread and a CSM thread in accessing states stored in the CSM context and the conflicting workflow thread.

* * * * *